United States Patent Office 3,429,316
Patented Feb. 25, 1969

3,429,316
TOBACCO COMPOSITIONS
Earl H. Hess, Lancaster, Pa., assignor to Backman Chocolate Manufacturing Company, Mount Joy, Pa., a corporation of Pennsylvania
No Drawing. Filed Apr. 20, 1965, Ser. No. 449,638
U.S. Cl. 131—17                    9 Claims
Int. Cl. A24b 3/12, 15/00

ABSTRACT OF THE DISCLOSURE

Tobacco compositions incorporating by-products of a cocoa or chocolate manufacturing process, specifically, cocoa shells or cocoa-shell containing "expeller cake." These additives provide the tobacco composition, either natural or reconstituted tobacco, or mixtures of the same, with a highly desirable flavor, while reducing the cost of such compositions by utilizing a material which is normally a waste by-product of chocolate manufacturing. Although the chocolate by-products may be added to the aqueous slurry of comminuated tobacco material before pressure cooking or autoclaving the same to form reconstituted tobacco, it is preferably to afterload, or add the by-products to the dough which results from the autoclaving operation. Further improvement of the flavor of the tobacco composition may be effected by adding a minor amount of an oxidizing material such as hydrogen peroxide prior to steam drying of the reconstituted sheet. The coarse shell by-product which forms the largest percentage of the chocolate by-products and which includes the smallest proportion of nibs, is found to provide the most favored taste when incorporated into tobacco compositions.

---

This invention relates to the manufacture of smoking products and relates more particularly to a tobacco composition incorporating by-products of a cocoa or chocolate manufacturing process.

It has been known for some time that various chocolate products find favor in the formulation of smoking tobaccos. Heretofore, such products have been in the form of chocolate liquors or purees of cocoa powder which are relatively expensive to manufacture thereby adding significantly to the cost of the smoking products. Thus, although the flavors inherent in chocolate may be desirable in cigarettes and the like, the previously known procedures for incorporating the same have not been commercially attractive.

It has also been suggested heretofore to use reconstituted tobacco as an extender in the manufacture of tobacco products, the reconstituting procedures generally using poor quality tobaccos and upgrading the taste of the same by various processing treatments. Ordinarily, the major interest in using reconstituted tobacco is to reduce the cost of the tobacco composition without detrimentally affecting the taste of the same to any great degree. Improvement of the flavor by such procedures has generally been too much to expect.

It is a primary object of this invention to provide for the production of tobacco compositions and smoking products which are less expensive than those available heretofore while concomitantly upgrading the flavor of the same. Consistent with this main objective, the present invention is directed to the incorporation of a low cost, high bulk, taste-enriching material into a tobacco composition in an efficient manner.

Such an advantageous material is found in cocoa shell-containing, chocolate manufacturing by-products. Cocoa beans in their shells are conventionally processed by roasting the same at elevated temperatures until the kernel dehydrates and shrinks away from the shell wall. The shells are then cracked and separated from the kernels which are further processed in various ways to produce cocoa powder and other known chocolate products. After cracking the shells to remove the same from the roasted cocoa beans, they are normally separated from the kernels by a conventional air classification procedure. Basically, the cracked shells can be separated into a coarse fraction, a medium fraction, and a fines fraction, the former comprising the major portion and having a particle size larger than a 6 mesh screen, the intermediate fraction having a small percentage of nibs with the shell and generally passing through a 6 mesh screen and being received on a 16 mesh screen, and the latter fraction including a larger percentage of nibs although too much shell is present to be utilized in the manufacture of cocoa powder, this fraction being the remainder which passes through the 16 mesh screen. The medium and fines fraction are normally further processed by heating and pressing the same to remove a substantial portion of their fat content, the residue from this procedure being known as "expeller cake."

The shells and other shell-containing by-products from this manufacturing procedure such as the expeller cake are normally considered a waste by-product for which little use other than as a fertilizer has been known heretofore.

It can be readily seen that it would be to great advantage to utilize such by-products for other, more commercially attractive, purposes. It has now been found that such cocoa shell-containing by-products may be incorporated into tobacco compositions and function admirably therein as a filler or extender and surprisingly, that smoking products manufactured utilizing such compositions are received even more favorably than those containing only tobacco.

Although it is contemplated within the scope of the instant inventive concept that the cocoa shells and expeller cake by-produced during the manufacture of chocolate products may be used directly as an additive to any tobacco composition whether the composition is to be eventually merchandised in the form of cigarettes, cigars, pipe tobacco or other smoking products, this application is primarily concerned with the use of such materials in the manufacture of reconstituted tobacco compositions and any and all uses to which reconstituted tobacco is conventionally put.

Many procedures have been developed for the production of reconstituted tobacco products. Frequently, disintegrated or comminuted tobacco leaves, stalks or stems are prepared by grinding or milling the same to a fine powder-like form either dry or in the pesence of an aqueous or other liquid carrier. Binding agents such as carboxymethyl cellulose or other suitable adhesive materials may be incorporated in the finely divided tobacco and the product may be rolled out to form a flat sheet which is then dried to the desired moisture content. The reconstituted sheet preferably has sufficient strength so that it may be handled during further processing, possibly being shredded for admixture with natural tobacco to provide the final product such as cigarettes.

Similarly, reconstituted tobacco sheets are conventionally formed by common paper making processes for use in the same manner.

Other procedures suggested heretofore for the manufacture of reconstituted tobacco have included utilizing a web or carrier of paper as a matrix and casting powder-like tobacco particles in admixture with an adhesive, such as the carboxymethyl cellulose mentioned hereinabove, onto the matrix to form the desired sheet material. Akin to this process is the suggested formation of a reconstituted tobacco sheet by casting a layer of a film-forming material onto a base web and then applying the finely ground particles of tobacco to the wet web.

Each of the above prior art processes have been developed for converting the tobacco leaves, trimmings, stalks and stems into continuous coherent sheets which may be utilized in the manufacture of smoking products such as cigarettes, cigars and the like. The concept of this invention may be used in combination with any of these procedures and other similar reconstituted sheet-making methods by incorporating the cocoa shell-containing by-products, preferably, but not necessarily, after grinding or comminuting the same in any conventional manner so that at least approximately 90 percent of the particles pass through a 150 mesh screen, into the material which is cast or otherwise formed into the reconstituted tobacco sheet at some convenient point in the manufacturing operation.

Although it is to be emphasized that the instant inventive concept is not dependent on the particular procedure utilized for manufacturing the reconstituted tobacco composition, but rather, in its broadest aspects, is directed to the basic discovery that cocoa shell-containing, chocolate manufacturing by-products are useful in tobacco compositions, one particularly advantageous method for manufacturing coherent tobacco products suitable for use with the additives of this invention is described in detail in U.S. Patent No. 3,020,179. According to that procedure at least a portion of the comminuted tobacco material is formed into an aqueous slurry and pressure cooked or autoclaved. While it is within the scope of this invention to incorporate the chocolate by-products into the aqueous slurry before cooking of the same, it has been found to be preferable to afterload or add the same to the dough which results from the autoclaving operation. The thus-formed admixture may be cast or evenly spread onto a supporting element and dried to provide a coherent, self-supporting sheet or web which is subsequently processed in any conventional manner for the manufacture of smoking products. The ground by-product is found to be fully compatible with the other ingredients in the reconstituted sheet, and cigarettes fabricated utilizing such material are found to be as satisfying, and in many instances even more satisfying, than similar products made from either all natural tobacco or an admixture of natural tobacco with conventional reconstituted tobacco in the absence of cocoa shell-containing substances.

The above procedure has certain advantages over other reconstituting methods in that it precludes the necessity of utilizing extraneous binding agents and avoids certain undesirable processing treatments which may deleteriously affect the taste and aroma of the tobacco composition.

The flavor of the material so produced may be even further improved by adding a minor amount of an oxidizing material such as the hydrogen peroxide suggested in said Patent No. 3,020,179, prior to steam drying of the sheet. Further, various other flavorings, aroma materials, humectants and the like may be added to the tobacco either before or after the autoclaving treatment although a composition merely including tobacco and by-product is completely satisfactory unless some special effect is desired.

Tobacco compositions so produced may be utilized in any manner conventional with reconstituted materials including its application as a filler, binder, or wrapping for cigars or, after cutting or shredding, its use in cigarettes or pipe tobacco alone or in combination with other tobacco or additive constituents.

Generally, reconstituted tobacco materials are not used in quantities greater than from about 10 to 15 percent of the final smoking product, although it is contemplated that the material of this invention, due to its unique properties may find favor in even higher proportions. Preferably, the by-product is present in an amount of at least approximately 3 percent by weight of the final composition and usually up to about 15 percent by weight although substantially greater quantities may be utilized in certain instances.

Thus, it will be seen that although many and sundry additives have been suggested for use in tobacco compositions heretofore, no such material combines the unusual qualities realized with the cocoa shell-containing, chocolate manufacturing by-products according to this invention. Not only is there herein provided a procedure for utilizing what has normally been considered a waste by-product, but such procedure has resulted in the production of tobacco compositions of substantially reduced cost and of surprisingly improved flavor.

Although any of these by-products will result in the advantageous properties described hereinabove, and while it would be expected that if any portion of the cocoa shells would be preferably for such use, the fines, or that fraction including the greatest proportion of nibs, would fit this category, surprisingly, it has been discovered that it is the coarse shell by-product which result in the most favored taste when incorporated into the tobacco compositions. This phenomenon is of particular interest since, as pointed out hereinabove, the coarse cocoa shells form the largest percentage of the chocolate by-products.

For a further understanding of the instant inventive concept, the following examples which are to be considered as illustrative, and not limiting, are set forth.

Example I

A quantity of relatively poor quality and generally undesirable tobacco for normal use in high grade smoking products was utilized to form a reconstituted product in the following manner. One part of the tobacco was added to approximately 20 parts of water and the mixture was homogenized in a Waring Blendor to form a "dough" or slurry which was added to an autoclave and pressure cooked at 15 p.s.i.g. for from 5 to 10 minutes. The dough was divided into small batches and to each batch was added a quantity of the various chocolate by-products previously ground so that at least approximately 90 percent of each sample passed a 150 mesh screen. Each batch was then homogenized to give a final dough consisting of approximately 1 part afterloaded (i.e., loaded after the pressure cooking) by-product, 2 parts cooked tobacco and 18 parts water. As controls, further doughs were prepared, one of which had additional finely ground tobacco substituted for the afterloaded by-product to provide an all-tobacco composition, and another of which had cocoa powder substituted for the product. Each of the resultant doughs was divided in half and to one half of each batch was added a 30 percent hydrogen peroxide solution in an amount equal to approximately ⅓ by weight of the dry ingredients of the mix. No further additives were added to the other half of each batch.

Each of the doughs were cast or spread in films or sheets of approximately 5 mm. thickness on stainless steel plates and dried over a steam bath. The sheets were reordered by inverting on the steam bath after which they could be peeled off the plates with the aid of a sharp "doctor" blade. The sheets were all coherent and of adaquate strength for further handling. The peroxide treated sheets were always lighter in color, stronger and more easily removed from the plates.

Cigarette filler material was prepared by shredding the above sheets and combining one part of shredded sheet with two parts of Bugler cigarette tobacco. Thus, each tobacco composition other than the controls contained approximately one-ninth chocolate by-product.

Cigarettes were prepared on a hand-rolling machine using approximately 1.3 grams of each of the above mixtures per cigarette.

The cigarettes were coded and 3 of each type, including 3 coded pure Bugler controls, were supplied to a 7 person taste panel. The panelists were instructed to rate the same on a scale of from one to five, the lower number indicating better flavor. The following table summarizes the results of the panel's preference.

TABLE 1

| Rating | Tobacco composition | Oxidized by $H_2O_2$ |
|---|---|---|
| 1.9 | Coarse shell sheet, 1 part, plus Bugler, 2 parts. | Yes. |
| 2.1 | All poor grade tobacco sheet, 1 part, plus Bugler, 2 parts. | Yes. |
| 2.1 | Medium shell sheet, 1 part, plus Bugler, 2 parts. | Yes. |
| 2.3 | Fines shell sheet, 1 part, plus Bugler, 2 parts. | Yes. |
| 2.6 | Coarse shell sheet, 1 part, plus Bugler, 2 parts. | No. |
| 2.6 | Fines shell sheet, 1 part, plus Bugler, 2 parts. | No. |
| 2.7 | Cocoa powder sheet, 1 part, plus Bugler, 2 parts. | Yes. |
| 2.7 | Medium shell sheet, 1 part, plus Bugler, 2 parts. | No. |
| 2.9 | Cocoa powder sheet, 1 part, plus Bugler, 2 parts. | No. |
| 3.1 | All Bugler | No. |
| 3.1 | All poor grade tobacco sheet, 1 part, plus Bugler, 2 parts. | No. |

Apparent ties were resolved by differences in the next decimal place in the order of preference listed above.

The table clearly shows that the afterloaded chocolate by-products improve the taste of the Bugler mixture. Further, the oxidation of the sheet even further upgrades the flavor. Finally, it will be seen that preference is shown for tobacco compositions utilizing coarse shells as a constituent of the reconstituted tobacco.

Example II

The procedure set forth in Example I was substantially repeated except that one part of the chocolate by-products were incorporated directly into an aqueous slurry of one part of tobacco prior to pressure cooking of the same followed by afterloading of an additional part of tobacco in contrast to the byproduct afterloading technique of Example I.

The results of a taste test panel on cigarettes formed with tobacco compositions in which the by-product was doughloaded and compared with cigarettes formed with afterloaded by-product compositions as in Example I showed a definite preference in favor of the Example I procedure. Thus, although the by-product may be incorporated at either point in the procedure, it is obvious that the afterloading technique is desirable since it produced preferred products and is less costly than a doughloading process.

As pointed out previously, although it has been found that this pressure cooking procedure is especially applicable to the manufacture of reconstituted tobacco compositions including chocolate by-products in accordance with the teachings of this invention, comminuted cocoa shell-containing by-products may be readily incorporated into other tobacco compositions including reconstituted tobacco materials formed by any of the many well-known prior art techniques, a variety of which are described hereinabove as illustrative, although it is to be understood that those procedures suggested are not to be considered as all-inclusive.

Similarly, although the specific examples are directed to the production of smoking products having approximately one-ninth by weight of chocolate by-products, at least some of the advantages of this invention will be realized by incorporating even much small quantities of by-product material into the tobacco compositions particularly in view of the fact that the by-products are extremely inexpensive and will act to replace and extend more expensive tobacco constituents. Additionally, as the quantitative ratio of the by-product increases, not only will the bulk of the fiberous particles of the cocoa shells be provided, but a flavor improvement will be realized. Further, the percentage of these additives may be increased substantially beyond the one-ninth of the examples although the quantity of such materials by-produced in chocolate production is such as to somewhat limit the maximum ratio as a practical matter.

It will now be seen that there is herein provided improved tobacco compositions and processes for their manufacture which satisfy all of the objectives of the instant invention, and others, including many advantages of great practical utility and commercial importance.

What is claimed is:

1. A smoking composition comprising a mixture of tobacco and a chocolate manufacturing by-product, said by-product including cocoa shells which have been separated from cocoa beans after roasting of said beans with said shells thereon.

2. A composition in accordance with claim 1 wherein at least a portion of said tobacco is reconstituted.

3. A composition in accordance with claim 2 including a natural tobacco portion and a reconstituted tobacco portion.

4. A composition in accordance with claim 3 wherein said reconstituted tobacco portion includes said by-product.

5. A composition in accordance with claim 3 wherein said by-product is present in an amount of at least about 3 percent by weight.

6. A composition in accordance with claim 5 wherein said by-product is present in an amount of from approximately 3 to approximately 15 percent by weight.

7. A composition in accordance with claim 3 wherein said reconstituted tobacco portion is a shredded, oxidized product and is intimately intermixed with said natural tobacco portion.

8. A composition in accordance with claim 1 wherein said mixture constitutes at least a portion of a smoking product.

9. A composition in accordance with claim 8 wherein said mixture is formed into a cigarette.

References Cited

The Dispensatory of the U.S., Osol-Farrar (25th edition), 1955, pub. by Lippincott Co., Philadelphia, pp. 203 and 204 cited.

The Chemistry and Technology of Tobacco (Text) by A. A. Shmuk, vol. III, pub. by Pishchepromizdat, Moscow, 1953. Translation pub. by National Science Foundation of 1961. Available from Office of Technical Services, U.S. Dept. of Commerce, Washington, D.C., pp. 602, 603 and 611.

MELVIN D. REIN, *Primary Examiner.*

U.S. Cl. X.R.

99—23; 131—140, 144